United States Patent [19]
Halko et al.

[11] Patent Number: 6,139,617
[45] Date of Patent: *Oct. 31, 2000

[54] TITANIUM DIOXIDE PIGMENTS

[75] Inventors: John E. Halko, Okarche; Frances K. Tyler, Edmond, both of Okla.; David A. Doherty, Aberdeen, Miss.

[73] Assignee: Kerr-McGee Chemical LLC, Oklahoma City, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,167

[22] Filed: Sep. 9, 1997

Related U.S. Application Data

[63] Continuation-in-part of application No. 08/925,118, Sep. 8, 1997, abandoned.

[51] Int. Cl.$^7$ ...................................................... C09C 1/36
[52] U.S. Cl. ........................ 106/448; 106/442; 106/445; 106/446; 106/447; 428/403; 428/404
[58] Field of Search ..................... 106/436, 442, 106/445, 446, 447, 448; 428/403, 404

[56] References Cited

U.S. PATENT DOCUMENTS

| | | | |
|---|---|---|---|
| 3,015,573 | 1/1962 | Myers et al. | 106/300 |
| 3,172,772 | 3/1965 | Rowe | 106/300 |
| 3,506,466 | 4/1970 | Bramekamp et al. | 106/448 |
| 3,514,304 | 5/1970 | Binnis | 166/300 |
| 3,674,528 | 7/1972 | Bronson | 106/448 |
| 4,599,114 | 7/1986 | Atkinson | 106/300 |
| 4,752,340 | 6/1988 | Brand et al. | 106/448 |

OTHER PUBLICATIONS

Database WPI, Week 8030, Derwent Publications Ltd., London, Great Britain; AN 80–52918c, XP–002088895 & SU 702 048 A (Titanium Res. Plan), Dec. 10, 1979.

*Primary Examiner*—Michael Marcheschi
*Attorney, Agent, or Firm*—C. Clark Dougherty, Jr.

[57] ABSTRACT

There are provided titanium dioxide pigments characterized by improved gloss developing and dispersibility properties in surface coating vehicles and reduced dispersant requirements. Said titanium dioxide pigments comprise pigmentary titanium dioxide particles having deposited thereon a treating agent comprising at least one amine salt of a monoprotic.

33 Claims, No Drawings

TITANIUM DIOXIDE PIGMENTS

CROSS REFERENCE TO RELATED APPLICATION

This is a continuation-in-part of application Ser. No. 08/925,118, filed Sep. 8, 1997 abandoned.

FIELD OF THE INVENTION

The present invention relates to titanium dioxide pigments characterized by their improved gloss developing and dispersibility properties in surface coating vehicles and by their reduced dispersant requirements. More specifically, the present invention relates to pigmentary titanium dioxide particles having adsorbed on the surfaces thereof a treating agent comprising an amine salt of a monoprotic acid.

BACKGROUND OF THE INVENTION

Pigmentary titanium dioxide is the most widely used white pigment in commerce today. Its pre-eminence is due, in the main, to its extraordinary combination of properties including little or no adsorption of visible light, high refractive index, high opacity and the ability to confer durability to coatings containing this pigment. However, regardless of the pre-eminence of this pigment much effort has been and continues to be expended to further improve its performance. This particularly is true with regard to efforts to reduce the pigment's dispersant requirements to improve its gloss developing and dispersibility characteristics.

Many proposals have been made in the art for improving the gloss developing and dispersibility characteristics of pigmentary titanium dioxide. In general, these proposals have involved the treatment of the pigment with a diversity of organic substances of various descriptions. For example, U.S. Pat. No. 3,015,573 discloses the treatment of dry titanium dioxide pigments with amine salts prepared from water soluble tertiary amines such as triethanolamine with sparingly water soluble organic acids such as adipic acid. According to this patent, the use of sparingly water soluble organic acids, i.e., acids having water solubilities in the range of from 0.05 to 2.0 weight percent, to prepare the amine salt treating agents is essential if pigments that are more readily dispersible in both organic and aqueous media are to be obtained, a major objective of the invention of this patent. In addition to being more readily dispersible, the pigments described in this patent are said to exhibit a greater tendency to dry flow and to form as few as 20 percent of the oversize aggregates which said pigment would otherwise form. The other principal physical properties, e.g., oil adsorption, color, gloss and the like are substantially unaffected and remain substantially those of the corresponding pigments without the amine salt.

In a similar manner, U.S. Pat. No. 3,506,466 discloses the chemical treatment of pigmentary titanium dioxide to improve its dispersibility. According to this patent, amine salts prepared from alkanolamines such as triethanolamine, triisopropanolamine, and the like and oxycarboxylic acids such as citric acid, tartaric acid, and the like are capable of improving the dispersibility of pigmentary titanium dioxide as well as other properties thereof including tinting strength and scattering coefficient. The amine salts are applied either in pure form or dissolved in water and added to an aqueous slurry of the pigment. The slurry then is dried and the dried pigment subjected to fluid energy milling.

U.S. Pat. No. 3,825,438 discloses the coating of titanium dioxide pigment with one or more hydrous metal oxides in the presence of a polyhydric alcohol and/or a carboxylic acid. The alcohols and/or the acids useful in the practice of the invention of this patent are those that contain at least two hydroxyl groups, which term is defined to include the hydroxyl groups present in the carboxyl groups of the acids. In accordance with the teachings of this patent, while the alcohols and/or acids can be added to the titanium dioxide pigment at any convenient stage, it is essential that such addition be accomplished prior to completion of the deposition of the hydrous metal coating. The resulting pigment is said to have improved dispersibility when compared with a pigment coated in the absence of these alcohols and/or acids. In addition, such treatment is said to further improve one or more of the gloss, hiding power, stoving color and drying time of the pigment produced using this treatment.

A treatment specifically directed to improving the gloss developing properties of titanium dioxide pigment is disclosed in U.S. Pat. No. 3,173,722. According to the disclosure of this patent, the gloss developing properties of titanium dioxide pigments are improved by treating a wet milled hydrous metal oxide coated titanium dioxide pigment with a combination of either benzoic or para-aminobenzoic acid and an amine such as triethanolamine. The treatment merely comprises adding the acid and amine to the pigment and, without removing these materials from the pigment, milling the pigment to produce a finely divided, high tinting strength material having greatly improved gloss developing properties.

It is evident from the above art disclosure that many different chemical treatments have been proposed to improve various physical properties of titanium dioxide pigments. This is particularly true with respect to improving the dispersibility and dry flow characteristics of titanium dioxide pigment. However, many of the chemical treatments proposed would appear to be specific for improving only that property of the pigment which it is desired to improve. At best, other properties remain substantially the same as the corresponding untreated pigment or, at worst, are adversely affected by the treatment.

The present invention is directed principally to the chemical treatment of titanium dioxide pigments to improve the dispersibility of the pigment in surface coating vehicles. Surprisingly, however, the pigments so treated further exhibit significantly improved gloss developing properties and lower dispersant demands.

SUMMARY OF THE INVENTION

The present invention relates to titanium dioxide pigments having improved dispersibility and gloss developing properties in surface coating vehicles and reduced dispersant requirements. Particularly, the titanium dioxide pigments of this invention comprise pigmentary titanium dioxide particles having adsorbed on the surface thereof, a treating agent comprising an amine salt of a monoprotic acid.

The invention further relates to a method for treating titanium dioxide pigments with said amine salts to provide the improved titanium dioxide pigments of the invention.

DETAILED DESCRIPTION OF THE INVENTION

The present invention arises from the discovery that amine salts described below will, when applied to the surface of a titanium dioxide pigment, impart to said pigment improvements in certain of the physical properties thereof. These improvements include an increase in the dispersibility of said pigment in a surface coating vehicle, an increase in the gloss developing properties of said pigment and a reduction in the dispersant requirement. These improvements are obtained whether the pigment undergoing treatment is a bare or noncoated pigment or a coated pigment, i.e., a pigment having one or more materials such as the known hydrous oxides of the metals aluminum, titanium, zirconium, cerium, silicon, zinc, and the like deposited thereon.

The preferred amine salts which can be used to prepare the improved titanium dioxide pigments of this invention are dimethylolpropionic acid (DMPA)+triisopropanolamine (TIPA), DMPA+TIPA+trimethylolethane (TME), and DMPA+TIPA+trimethylolpropane (TMP), dimethylolbutanoic acid (DMBA)+TIPA, DMBA+TIPA+TME, and DMBA+TIPA+TMP.

Advantageously, the amine salts employed to produce the titanium dioxide pigments of this invention contain a molar ratio of from about 1:1::1:2, preferably from about 1:1::1:1.1, dimethylolpropionic acid or dimethylolbutanoic acid to triisopropanolamine, thus producing a neutral salt with or without excess alkanolamine. Preferably such amine salts contain a ratio of from about 95:5::1:1 amine salts to trimethylolethane. The amine salts of this invention also preferably contain a ratio of from about 95:5::1:1 amine salts to trimethylolpropane.

Known alkanolamines useful in preparing the amine salts of the present invention are disclosed in U.S. Pat. No. 4,752,340. It has been discovered that triisopropanolamine (TIPA) is preferred in this application.

The amine salts employed to produce the improved titanium dioxide pigments of the present invention can be used as preformed solutions or they can be formed in situ in the presence of the pigment to be treated. When this latter procedure is employed, one more convenient means for accomplishing the formation of the acid or amine salt and its adsorption by the pigment is by metering the pigment and the desired acid and amine into a grinding apparatus known as a fluid energy mill. Examples of such mills are disclosed in U.S. Pat. No. 2,032,827 and U.S. Pat. No. 2,219,011. In using such mills, the pigment is introduced as a jet into a stream of superheated steam circulating through the mill at extremely high velocities whereby the pigment particles are entrained in said steam and caused to collide with each other with great force. The small amounts of the acid and amine required to produce the amine salt either can be metered directly into the mill or into the pigment stream as said stream enters the mill. The collisions which occur between the pigment particles within the mill spread the acid or amine salt uniformly over the surface of the colliding particles.

Generally, the amine salts disclosed hereinabove and used to prepare the improved titanium dioxide pigments of this invention will be employed in the form of preformed solutions. A preformed solution is prepared simply by adding the desired quantity of the acid or amine to a suitable solvent. Such solvent can be any organic liquid or, preferably, water. This preformed solution then is added to the pigment in any convenient manner including adding the solution to a slurry of the pigment, spraying the solution onto the pigment or metering the preformed solution into a fluid energy mill for treatment of the pigment therein in a manner similar to that discussed above.

Whether employed as a preformed solution or formed in situ during the milling of the pigment to be treated with the amine salt, the amounts of amine salt will be amounts sufficient to result in an essentially neutral condition (i.e., having a pH of from about 6.0 to about 8/0).

The amount of the amine salt added to or formed in situ and deposited on the surface of the titanium dioxide pigment will range from about 0.01 to about 3.0 weight percent based on the weight of the pigment. Preferred amounts range from about 0.2 to about 0.5 weight percent.

In a preferred embodiment of this invention, the titanium dioxide pigments to which the amine salts described hereinabove can be applied will be those pigments upon which has been deposited one or more coatings of a hydrous oxide of a metal selected from the group consisting of aluminum, titanium, zirconium, cerium, silicon, zinc, and the like. Methods for depositing such hydrous metal oxide coatings upon bare titanium dioxide pigments are well known. While such methods may vary with respect to the particular processing conditions employed, most of these methods utilize similar procedures for forming the coating of the hydrous metal oxide on the pigment particles. Thus, in general, a water soluble salt or compound of aluminum, titanium, zirconium, cerium, silicon, zinc, and the like is first mixed with an aqueous dispersion or solution of the titanium dioxide pigment to be coated. After addition of the water soluble salt or compound the pH of the aqueous dispersion or solution is altered to effect the precipitation of the desired hydrous metal oxide onto the pigment. When the added water soluble salt or compound produces an acid pH condition in the aqueous dispersion or solution of the pigment, then it is necessary to alter this pH by the addition of an alkali to effect precipitation of the hydrous metal oxide. When the added water soluble salts or compounds produce an alkaline pH then it is necessary to add an acid to produce the desired precipitation. However, in these methods it is possible to employ acid reacting and basic reacting water soluble salts or compounds to effect the desired precipitation thereby eliminating the need for any separate addition of acids or alkali.

Generally, in applying a coating of a hydrous metal oxide to the titanium dioxide pigment any water soluble hydrolysable salt may be used to provide the coating of the hydrous metal oxide. Thus, salts such as aluminum sulfate, aluminum nitrate, titanium sulfate, titanium tetrachloride, zirconium sulfate, cerium sulfate and zinc sulfate can be employed. Alkali metal aluminates may be employed in place of the water soluble aluminum salts. Generally, hydrous silicon oxide or silica coatings are provided through the use of water soluble silicates such as the alkali metal silicates as represented by sodium silicate.

The above described general methods for applying hydrous metal coatings to the titanium dioxide pigment, and which methods do not form any part of the present invention, can be carried out either in a batchwise manner or continuously. In a continuous operation, the water soluble salts or compounds of one or more of the metals of aluminum, titanium, zirconium, cerium, silicon, zinc, and the like will be added to a continuous flowing stream of the aqueous dispersion of the titanium dioxide pigment.

The amount of the hydrous metal oxide or oxides deposited onto the titanium dioxide pigment can vary over a wide range, but usually will be at least about 0.05 weight percent and can be up to about 15 weight percent. A more preferred range for the amounts of the hydrous metal oxide or oxides deposited on the pigment will range from about 0.5 weight percent to about 10 weight percent based on the weight of the pigment.

Most preferred titanium dioxide pigments for use in preparing the improved titanium dioxide pigments of this invention are those titanium dioxide pigments having deposited thereon one or more hydrous metal oxides selected from the group consisting of alumina, silica and titanium oxides.

As noted throughout this disclosure, the amine salts described hereinabove are capable of providing titanium dioxide pigments characterized by increased dispersibility and gloss developing properties in surface coating vehicles and lower dispersant requirements in water base coatings. The magnitude of the increases in dispersibility and gloss developing properties and reduction in dispersant demand is significant, particularly when compared to untreated pigment or pigment treated with more conventional materials, e.g., polyols such as trimethylolethane, or other amine salts such as those described in U.S. Pat. No. 4,752,340. However, the greatest benefit provided by the titanium dioxide pigments of this invention is in their significantly improved dispersant requirement in water based coatings when compared to other amine salts.

The invention is further described and illustrated by the examples which follow. The examples represent specific embodiments of the invention and are not to be construed as limitations thereon.

EXAMPLES 1–14

Examples 1–14 are finished pigment samples representative of the improved titanium dioxide pigment of the present invention. In general, each of Examples 1–14 was prepared by first blending a particular amine salt solution as disclosed herein with a particular commercially produced titanium dioxide base pigment, i.e., a pigment having deposited thereon coatings of one or more hydrous metal oxides and requiring final dry milling and classification. Each of the resulting pigment/amine salt blends was subjected to milling to provide the finished pigments comprising Examples 1–14.

In order to determine the gloss, scatter, tint strength, and dispersant demand improvements using the present invention, a set of experimental pigments were produced. Base pigments were sandmilled to approximately 98%<0.49$\mu$ and micronized at 1.8 steam/pigment. The milling aids used and results are given in Table 1.

but good gloss and tint strength. The amine salt of the present invention resulted in both low dispersant demand and good gloss and tint strength.

While this invention has been described and illustrated by the Examples shown, other variations may be employed within the scope of the following claims.

What is claimed is:

1. Titanium dioxide pigments which exhibit improved gloss developing and dispersibility properties in surface coating vehicles and reduced dispersant requirements, said pigments comprising pigmentary titanium dioxide particles having deposited thereon a treating agent comprising the reaction product of at least one monoprotic acid selected from the group consisting of dimethylolpropionic acid and dimethylolbutanoic acid and an amine.

2. The pigments of claim 1 wherein said treating agent is deposited on said pigment in an amount ranging from about 0.01 to about 3.0 weight percent based on the weight of said pigment.

3. The pigments of claim 2 wherein the amount of said treating agent deposited on said pigment ranges from about 0.2 to about 0.5 weight percent based on the weight of said pigment.

4. The pigments of claim 1 further having deposited thereon at least one hydrous metal oxide selected from the group consisting of alumina, silica, and titania oxides in an amount ranging from about 0.5 to about 10.0 weight percent based on the weight of said pigment.

5. The pigments of claim 1 wherein the treating agent has a pH of from about 6.0 to about 8.0.

6. Titanium dioxide pigments which exhibit improved gloss developing and dispersibility properties in surface coating vehicles and reduced dispersement requirements comprising pigmentary titanium dioxide particles having deposited thereon from about 0.01 to about 3.0 weight percent, based on the weight of said particles, of a treating agent comprising the reaction product of at least one monoprotic acid selected from the group of dimethylolpropionic acid and dimethylolbutanoic acid and an amine.

7. The pigments of claim 6 wherein the treating agent has a pH of from about 6.0 to about 8.0.

8. The pigments of claim 6 further having deposited thereon at least one hydrous metal oxide selected from the

TABLE 1

RESULTS FROM MILLING AID STUDY

| Example | Base | Milling Aid | Excess TIPA | Gloss | Scatter | Tint Strength | Dispersant Demand |
|---------|------|-------------|-------------|-------|---------|---------------|-------------------|
| 1 | 1 | other amine salt |   | 64 | 6.16 | 713 | 0.84 |
| 2 | 1 | TME |   | 61 | 6.03 | 693 | 0.67 |
| 3 | 1 | RMP |   | 62 | 6.10 | 701 | 0.71 |
| 4 | 1 | DMPA/TIPA | N | 64 | 6.14 | 733 | 0.61 |
| 5 | 1 | DMPA/TIPA | Y | 64 | 6.07 | 722 | 0.64 |
| 6 | 1 | DMPA/TIPA | Y | 63 | 6.20 | 711 | 0.64 |
| 7 | 1 | DMPA | Y | 63 | 6.14 | 696 | 0.58 |
| 8 | 2 | other amine salt |   | 61 | 6.18 | 670 | 0.93 |
| 9 | 2 | TME |   | 59 | 6.15 | 627 | 0.53 |
| 10 | 2 | TMP |   | 58 | 6.10 | 635 | 0.67 |
| 11 | 2 | DMPA/TIPA | N | 61 | 6.16 | 635 | 0.55 |
| 12 | 2 | DMPA/TIPA | N | 61 | 6.21 | 645 | 0.60 |
| 13 | 2 | DMPA/TIPA | Y | 60 | 6.27 | 676 | 0.65 |
| 14 | 2 | DMPA | Y | 61 | 6.19 | 670 | 0.65 |

As can be seen the Polyols (TME and TMP) gave good dispersant demand, but lower gloss and tint strength. The other amine salts gave higher (worse) dispersant demand, group consisting of alumina, silica and titania oxides in an amount ranging from about 0.5 to about 10.0 weight percent based on the weight of said pigment.

9. The pigments of claim 6 wherein the amount of the treating agent deposited on said pigment ranges from about 0.2 to about 0.5.

10. The pigments of claim 1 wherein the monoprotic acid is dimethylolpropionic acid.

11. The pigments of claim 1 wherein the monoprotic acid is dimethylolbutanoic acid.

12. The pigments of claim 6 wherein the monoprotic acid is dimethylolpropionic acid.

13. The pigments of claim 6 wherein the monoprotic acid is dimethylolbutanoic acid.

14. The pigments of claim 1 wherein the treating agent is dimethylolpropionic acid plus triisopropanolamine.

15. The pigments of claim 1 wherein the treating agent is dimethylolbutanoic acid plus triisopropanolamine.

16. The pigments of claim 6 wherein the treating agent is dimethylolpropionic acid plus triisopropanolamine.

17. The pigments of claim 6 wherein the treating agent is dimethylolbutanoic acid plus triisopropanolamine.

18. The pigments of claim 1 wherein the treating agent is dimethylolpropionic acid plus triisopropanolamine plus trimethylolethane.

19. The pigments of claim 1 wherein the treating agent is dimethylolbutanoic acid plus triisopropanolamine plus trimethylolethane.

20. The pigments of claim 6 wherein the treating agent is dimethylolpropionic acid plus triisopropanolamine plus trimethylolethane.

21. The pigments of claim 6 wherein the treating agent is dimethylolbutanoic acid plus triisopropanolamine plus trimethylolethane.

22. The pigments of claim 1 wherein the treating agent is dimethylolpropionic acid plus triisopropanolamine plus trimethylolpropane.

23. The pigments of claim 1 wherein the treating agent is dimethylolbutanoic acid plus triisopropanolamine plus trimethylolpropane.

24. The pigments of claim 6 wherein the treating agent is dimethylolpropionic acid plus triisopropanolamine plus trimethylolpropane.

25. The pigments of claim 6 wherein the treating agent is dimethylolbutanoic acid plus triisopropanolamine plus trimethylolpropane.

26. The pigments of claim 1 wherein said treating agent deposited thereon is an amine salt of said monoprotic acid.

27. The pigments of claim 6 wherein said treating agent deposited thereon is an amine salt of said monoprotic acid.

28. The pigments according to claim 26 wherein said amine is triisopropanolamine and said monoprotic acid and triisopropanolamine which form said treating agent product are in a ratio of from about 1:1::1:2.

29. The pigments according to claim wherein said treating agent product further comprises trimethylolethane and is formed of said amine salt of said monoprotic acid and trimethylolethane in a ratio of from about 95:5::1:1.

30. The pigments according to claim wherein said treating agent product further comprises trimethylolpropane and is formed of said amine salt of said monoprotic acid and trimethylolpropane in a ratio of from about 95:5::1:1.

31. The pigments according to claim 27 wherein said amine is triisopropanolamine and said monoprotic acid and triisopropanolamine which form said treating agent product are in a ratio of from about 1:1::1:2.

32. The pigments according to claim 27 wherein said treating agent product further comprises trimethylolethane and is formed of said amine salt of said monoprotic acid and trimethylolethane in a ratio of from about 95:5::1:1.

33. The pigments according to claim 27 wherein said treating agent product further comprises trimethylolpropane and is formed of said amine salt of said monoprotic acid and trimethylolpropane in a ratio of from about 95:5::1:1.

* * * * *

UNITED STATES PATENT AND TRADEMARK OFFICE
CERTIFICATE OF CORRECTION

PATENT NO. : 6,139,617
DATED : October 31, 2000
INVENTOR(S) : John E. Halko, Frances K. Tyler and David A. Doherty It is certified that error appears in the above-identified patent and that said Letters Patent is hereby corrected as shown below:

Column 8,
Line 16, insert -- 26 -- between "claim" and "wherein"; and
Line 20, insert -- 26 -- between "claim" and "wherein."

Signed and Sealed this

Sixth Day of August, 2002

Attest:

Attesting Officer

JAMES E. ROGAN
Director of the United States Patent and Trademark Office